(12) United States Patent
Tartal

(10) Patent No.: US 12,254,442 B2
(45) Date of Patent: Mar. 18, 2025

(54) ROBOTIC SMART LOCKER LOAD SYSTEM

(71) Applicant: UNITED STATES POSTAL SERVICE, Washington, DC (US)

(72) Inventor: William A. Tartal, Baltimore, MD (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

(21) Appl. No.: 18/154,381

(22) Filed: Jan. 13, 2023

(65) Prior Publication Data

US 2023/0245049 A1 Aug. 3, 2023

Related U.S. Application Data

(60) Provisional application No. 63/304,881, filed on Jan. 31, 2022.

(51) Int. Cl.
G06Q 10/0836 (2023.01)
(52) U.S. Cl.
CPC .................. G06Q 10/0836 (2013.01)
(58) Field of Classification Search
CPC ................................................. G06Q 10/08
See application file for complete search history.

(56) References Cited

U.S. PATENT DOCUMENTS

| | | | | |
|---|---|---|---|---|
| 10,043,151 B1 * | 8/2018 | Zhu | .................. | G06K 19/06037 |
| 10,968,012 B1 * | 4/2021 | Ward | ................. | B65D 11/1833 |
| 11,188,727 B1 * | 11/2021 | Lloyd | ..................... | G06K 7/015 |
| 2002/0178074 A1 * | 11/2002 | Bloom | ................... | G06Q 20/00 |
| | | | | 705/26.81 |
| 2018/0244469 A1 * | 8/2018 | Testa | ...................... | G07F 11/165 |
| 2021/0287164 A1 * | 9/2021 | Keenan, Jr. | ........... | B66B 1/2408 |
| 2021/0321810 A1 * | 10/2021 | Sun | ...................... | G07F 11/1653 |
| 2023/0115325 A1 * | 4/2023 | Thorp | ..................... | G07F 17/12 |
| | | | | 340/5.73 |

OTHER PUBLICATIONS

Beyond; "Personal Parcel Lockers: CleverPods"; Sep. 24, 2018; https://www.beyonddesign.com/personal-parcel-lockers-cleverpods/ (Year: 2018).*

* cited by examiner

*Primary Examiner* — Rupangini Singh
*Assistant Examiner* — David G. Godbold
(74) *Attorney, Agent, or Firm* — MH2 Technology Law Group, LLP

(57) ABSTRACT

A system for and method of providing a package for retrieval are presented. The disclosed techniques include receiving a package for retrieval by a recipient; placing the package in a customer inaccessible smart staging area; determining, using a sensor, a size of the package; retrieving, by a robot, the package; conveying, by the robot, the package through a first side of the customer accessible repository to a customer accessible repository selected according to the size of the package, where the package is retrievable by a customer through a second side of the customer accessible repository; electronically storing an identification of the customer accessible repository in association with package identification information; receiving, at an electronic customer interface located at the delivery facility, the package identification information; and unlocking the customer accessible repository, such that the package is retrievable from the second side of the customer accessible repository by the recipient.

16 Claims, 3 Drawing Sheets

ROBOTIC SMART LOCKER LOAD SYSTEM

RELATED APPLICATION

This application claims priority to, and the benefit of, U.S. Provisional Patent Application No. 63/304,881, entitled, "Robotic Smart Locker Load System," and filed Jan. 31, 2022, which is hereby incorporated by reference in its entirety.

FIELD

This disclosure relates generally to package delivery.

BACKGROUND

In general, delivering a package may involve leaving the package outside of a house or apartment, for example, if the intended recipient is not home. However, this situation is sub-optimal due to exposure to the elements and the possibility of package theft. Keeping the package at a distribution center for agent-facilitated customer pickup may also be sub-optimal, as such centers may have inconvenient hours of operation, require waiting in line, or the like.

SUMMARY

According to various embodiments, a method of providing a package for retrieval is presented. The method includes receiving, at a delivery facility, a package for retrieval by a recipient; placing the package in a customer inaccessible smart staging area; determining, using a sensor, a size of the package; retrieving, by a robot, the package from the smart staging area; conveying, by the robot, the package to a customer accessible repository selected according to the size of the package, where the conveying includes conveying the package through a first side of the customer accessible repository, and where the package is retrievable by a customer through a second side of the customer accessible repository different from the first side of the customer accessible repository; electronically storing an identification of the customer accessible repository in association with package identification information; receiving, at an electronic customer interface located at the delivery facility, and from the recipient, the package identification information; and unlocking the customer accessible repository, where the package is retrievable from the second side of the customer accessible repository by the recipient.

Various optional features of the above embodiments include the following. The smart staging area can include a plurality of locations for a plurality of package sizes, and the determining the size of the package can be based on a location of the package in the smart staging area. The sensor can include a scanner, and the determining the size of the package can include scanning a code affixed to the package and retrieving package size information from a backend system based on the scanning. The scanner can be attached to the robot and the scanning can be performed by the robot. The scanner can be attached to a fixture of the smart staging area. The placing the package in the smart staging area can include placing the package in a bin at the smart staging area, and the determining the size of the package can be based on the bin. The sensor can include a scanner, and the determining the size of the package can be based on scanning, by the scanner attached to at least one of the robot or a fixture in the smart staging area, a code affixed to the bin. The conveying can include inserting the bin, containing the package, into the customer accessible repository, where the bin lacks a wall corresponding to the second side of the customer accessible repository. The determining the size of the package can be based on an output from the sensor, where the sensor is attached to at least one of the smart staging area or the robot. The customer accessible repository can be one of a plurality of customer accessible repositories of a plurality of sizes, the method further including, prior to the conveying, determining that the customer accessible repository is unoccupied.

According to various embodiments, a system for providing a package for retrieval is presented. The system includes: a smart staging area located at a delivery facility that receives a package for retrieval by a recipient, the smart staging area including a sensor, where the system determines a size of the package based on an output from the sensor; a robot disposed to retrieve the package from the smart staging area and convey the package to a customer accessible repository, selected according to the size of the package, through a first side of the customer accessible repository, where the package is retrievable by a customer through a second side of the customer accessible repository different from the first side of the customer accessible repository; a backend computer system that electronically stores an identification of the customer accessible repository in association with package identification information; and an electronic customer interface located at the delivery facility, where the electronic customer interface is communicatively coupled to the backend computer system, where the backend computer system unlocks the customer accessible repository and the package is retrievable from the second side of the customer accessible repository by the recipient in response to the electronic customer interface receiving the package identification information from the recipient.

Various optional features of the above embodiments include the following. The smart staging area can include a plurality of locations for a plurality of package sizes, and the system can determine the size of the package based on a location of the package in the smart staging area as detected by the sensor. The sensor can include a scanner, and the system can determine the size of the package based on the sensor scanning a code affixed to the package and retrieving package size information from the backend computer system. The scanner can be attached to the robot and the scanning can be performed by the robot. The scanner can be attached to a fixture of the smart staging area. The system can further include a bin configured to accept the package in the smart staging area, where the system determines the size of the package based on the bin. The sensor can include a scanner, and the system can determine the size of the package based on scanning, by the scanner attached to at least one of the robot or a fixture in the smart staging area, a code affixed to the bin. The bin can lack a wall corresponding to the second side of the customer accessible repository and the bin containing the package can be insertable into the customer accessible repository. The sensor can be attached to at least one of the smart staging area or the robot. The customer accessible repository can be one of a plurality of customer accessible repositories of a plurality of sizes, where the backend computer system determines that the customer accessible repository is unoccupied.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
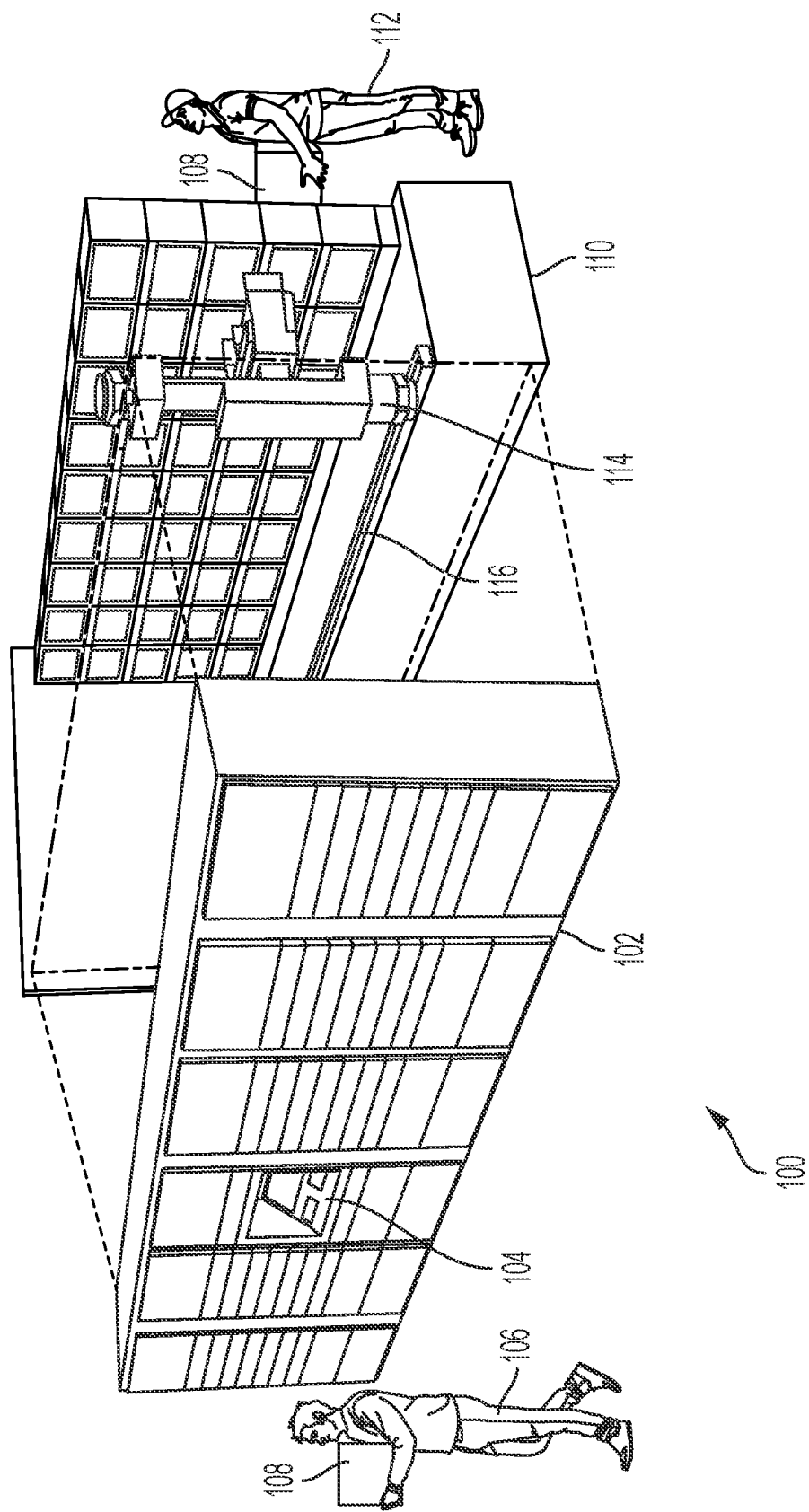
FIG. 1 is an exploded view of a three-dimensional conceptual model of a robotic smart locker load system according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Smart locker systems can provide package recipients with the ability to retrieve packages from package delivery distribution centers after-hours. Such systems can include one or more terminals into which a recipient can provide package information, e.g., by scanning a barcode. In response, the smart storage locker system can unlock a respective locker, and the recipient can retrieve their package therefrom. Smart locker systems are advantageous because they allow customers to obtain packages via a distribution center customer self-service area, which may be indoors or outdoors, 24 hours a day.

Agents in package delivery distribution centers, such as U.S. Post Office branches, have many responsibilities, including loading packages into smart lockers for retrieval by recipients. However, real-time customer demand at retail facilities can overburden agents and delay package loading into smart lockers. Particularly burdensome is the need to coordinate particular packages with particular lockers; for example, the need for an agent to obtain package information, enter it into a backend system that identifies a particular smart locker that is both vacant and sized appropriately for the package at issue, physically convey the package into the identified smart locker, and confirm placement of the package with the back end system. Accordingly, a system that could eliminate or reduce the need to identify particular smart lockers for loading packages would be advantageous and reduce or eliminate the problems identified above.

Some embodiments provide a robotic smart locker load system for a smart locker system installed inside a secure area of a post office or other package delivery distribution center. According to some embodiments, the smart locker load system includes a smart staging area onto, or into which, an agent can place a package for loading into a smart locker. According to such embodiments, the smart locker load system can automatically, or with little agent involvement, identify the package, identify the package size, and identify an appropriately-sized and vacant smart locker. Further, according to such embodiments, the smart locker load system includes a robot that automatically conveys the package from the smart staging area into the identified smart locker without requiring manual agent intervention. These and other features and advantages are described in detail herein.

FIG. 1 is an exploded view of a three-dimensional conceptual model of a robotic smart locker load system 100 according to various embodiments. Smart locker load system 100 includes smart locker system 102 and smart staging area 110. FIG. 1 depicts smart locker system 102 and smart staging area 110 in exploded view; in an embodiment, smart locker system 102 would be close enough to smart staging area, as shown by dotted lead lines, for robot 114 to convey packages therebetween as described in detail herein. The face of smart locker system 102 may be situated in a publicly accessible area, e.g., a self-service area, at a package distribution center, post office, or in a retail location, such as in an enclosed mall or strip mall, according to various embodiments. The rear of smart locker system 102, as well as smart staging area 110 may be located in a secure, publicly inaccessible area, e.g., a back office area, which may be separated from public areas by locked doors. The secure area includes robot 114, which conveys packages from smart staging area 110 to smart lockers within smart locker system 102 as described in detail herein.

Smart locker system 102 includes a plurality of individual smart lockers, with open backs, so as to be accessible by robot 114, and lockable doors in the front. Advantageously, the open backs allow for robot 114 to access each individual locker while remaining in the secure, publicly inaccessible area. Each lockable door has an individually controlled lock. The locks in the individual lockers are controlled, e.g., locked and unlocked, by a backend computer system of smart locker system 102. For example, electronically controlled solenoids may be used to implement the locks on respective lockers. The computer system is communicatively coupled to terminal 104, which may be one or a plurality of such terminals, situated within the publicly accessible area in which the face of smart locker system 102 is located.

The plurality of individual lockers of smart locker system 102 may include a plurality of lockers of various sizes in order to efficiently accommodate packages of varying sizes. As used herein, the term "package" includes boxes, parcels, envelopes, mailers, tubes (of any cross-sectional shape, not limited to circular cross sections), cartons, pouches, and any other container that can be mailed.

Customer 106 may retrieve package 108 from an individual locker of smart locker system 102 by providing package identification information to terminal 104 in any of a variety of ways. The package identification information may be a code, such as a graphical code or character code, associated with package 108 by a backend package tracking system. According to some embodiments, customer 106 scans a graphical code, such as a barcode or QR code, associated with package 108 using a scanner at terminal 104. According to some embodiments, customer 106 enters a character code, such as a numeric or alphanumeric code, associated with package 108 through a keypad or touch screen of terminal 104. Customer 106 may have obtained the graphical code and/or character code in any of a variety of ways. According to various embodiments, customer 106 obtains the graphical code and/or character code via email, text message, automated phone message, postcard, package tracking website, or other communication channel.

Once customer 106 provides the package identification information to terminal 104, terminal 104 communicates with the smart locker backend computer system to identify the particular locker of smart locker system 102 in which the identified package is located. For example, the backend system may retrieve, e.g., from a database, an identification of the particular locker as stored in association with the package identification information. Terminal 104 provides an identification of the particular locker to customer 106, e.g., by displaying and/or audibly. The backend system then sends a signal to the identified locker, causing the identified locker to unlock. Customer 104 may then open the identified locker and retrieve package 108. The locker may be configured to automatically close, e.g., using a spring, and automatically lock after the package is retrieved and the door closes.

Figure 2:
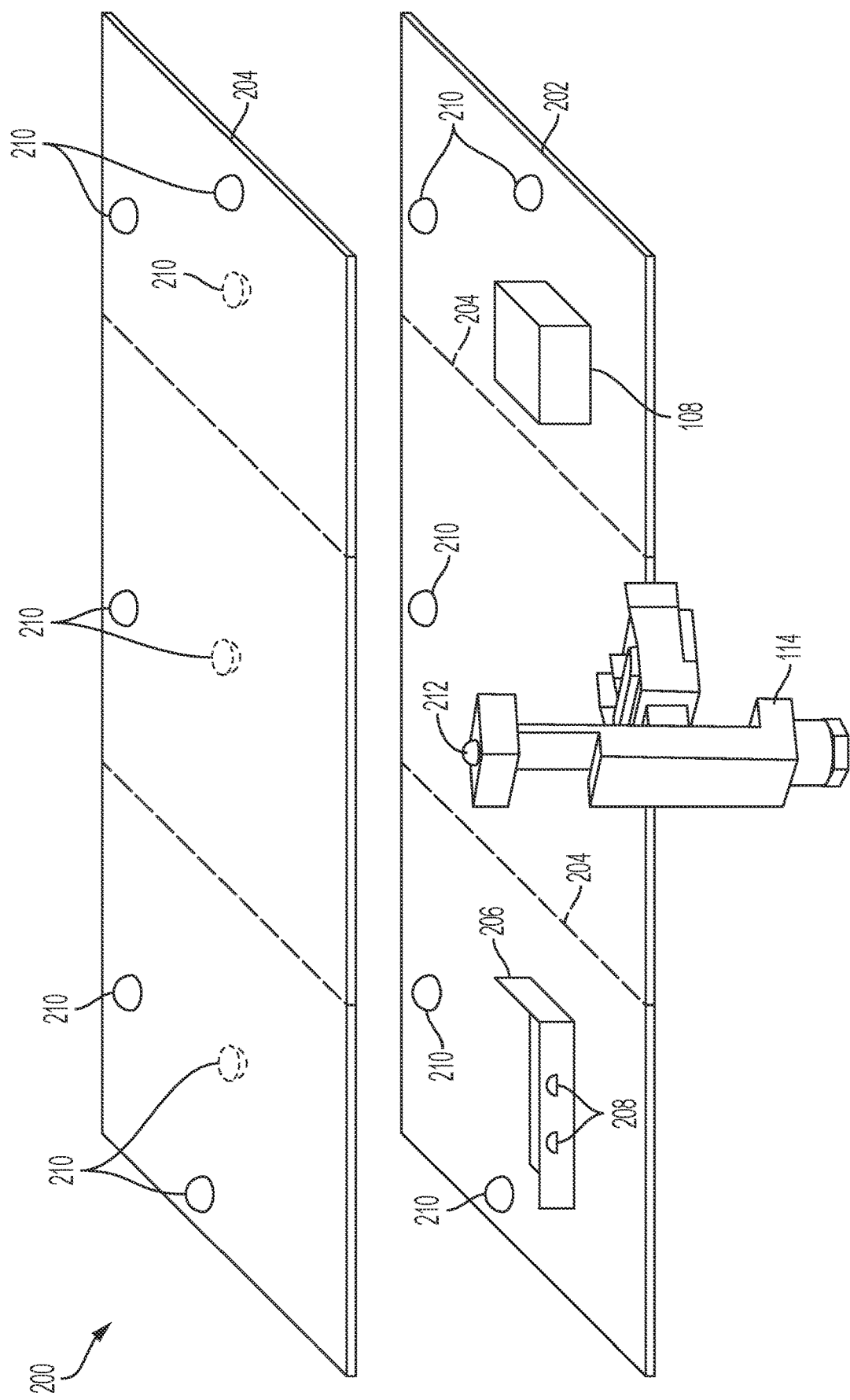
FIG. 2 is a three-dimensional model of a smart staging area of a robotic smart locker load system according to various embodiments.

Smart staging area 110 accepts packages, such as package 108, from agent 112 for robot 114 to load in lockers of smart locker system 102 for customer retrieval as described above. The pigeonholes of smart staging area 110 may be organized according to size, such that agent 112 may deposit appropriately-sized packages in their respective pigeonholes, and robot 114 retrieves and load them into correspondingly-sized lockers of smart locker system 102. Other techniques by which robotic smart locker load system 100 determines package size are shown and described in reference to FIG. 2. Although smart staging area 110 is depicted as a plurality of pigeonholes in FIG. 1, embodiments are not so limited. FIG. 2, for example, depicts a smart staging area in the form of a plurality of shelves. Further details of smart staging area 110 are shown and described below in reference to FIG. 2.

Robot 114 conveys packages from smart staging area 110 to lockers within smart locker system 102. Robot 114 as shown in FIG. 1 is installed on track 116 that provides positions of access to both smart staging area 110 and smart locker system 102. Thus, robot 114 may swivel about its vertical axis in order to alternately access smart staging area 110 and smart locker system 102. According to some embodiments, robot 114 may be free roaming, not restricted to a track such as track 116.

FIG. 2 is a three-dimensional model of a smart staging area 200 of a robotic smart locker load system according to various embodiments. By way of non-limiting example, smart staging area 200 may be implemented, and is so described herein, as an alternative to smart staging area 110 of smart locker load system 100. Thus, as shown in FIG. 2, smart staging area 200 is accessible by robot 114. Smart staging area 200 includes a plurality of shelves 202, 204, each of which may be configured as shelf 202. Although FIG. 2 depicts two shelves 202, 204, embodiments may include any number of shelves.

Smart staging area 200 includes sensor 210 disposed in various places about shelves 202, 204. More generally, sensor 210 may be attached to any fixture in smart staging area 200. Sensor 210 may be implemented as any of a variety of sensors, such as by way of non-limiting examples, a barcode or QR code scanner, a camera, an RFID sensor, or an acoustic, optical, or weight sensor according to various embodiments, as described in detail below. Similarly, sensor 212 is attached to robot 114, wherein sensor 212 may be implemented as any of a variety of sensors, such as by way of non-limiting example any of the aforementioned sensors, as described in detail below.

So that robot 114 places packages in appropriately-sized lockers of smart locker system 102, embodiments of robotic smart locker load system 100 can determine a size of a package, e.g., package 108, placed on a shelf 202, 204 smart staging area 200 according to any of a variety of techniques, as shown and described in reference to FIG. 2 presently.

According to a first package size determination technique, shelves 202, 204 are partitioned into areas corresponding to various package sizes. Such partitioning may be indicated to agents by way of visually apparent demarcations 204. Each area may be labeled with a size limit, e.g., "max 12"×12"×12"". Each shelf may have areas of a single dedicated associated size, or each shelf may have multiple different sized areas. According to some embodiments, particular size areas are arranged in vertical columns among the plurality of shelves. Robot 114 may be programmed with information indicating that packages on shelves 202 in particular demarcated areas are of particular maximum sizes. Robot 114 may utilize any of a variety of sensors, e.g., implemented as sensor 212, to determine its position relative to the demarcated areas and thus determine the sizes of the packages it retrieves therefrom. For example, robot 114 may have a camera implementation of sensor 212, coupled with computer vision algorithms, to determine the locations of the demarcations. Alternately, or in addition, robot 114 may include a position sensor, e.g., a sensor that determines the position of robot 114 on its track for embodiments that utilize a track such as track 116. Thus, robot 114, in concert with an agent who places packages onto appropriate partitioned areas of shelves 202, 204 of smart staging area 200, determines the sizes the packages in smart staging area 200.

According to a second package size determination technique, a package size is determined by scanning a graphical code affixed to the package placed on a shelf 202, 204 of smart staging area 200. The graphical code may be a barcode or QR code according to various embodiments. The graphical code may have been previously affixed to the package at the time of package intake and associated with a package size in a backend computer system. For example, when a package is mailed, an agent at the receiving facility may measure the package and enter its measurements (or measurement category, such as small/medium/large) into such a backend computer system in association with a tracking number. The tracking number may be associated in the backend system with a code represented by the graphical code, which may be printed and affixed to the package at the receiving facility.

Further according to the second package size determination technique, the graphical code on the package may be scanned by a scanner attached to a fixture in smart staging area 200. As shown in FIG. 2, such a scanner may be a QR code or barcode scanner, such as a scanner implementation of sensor 210. Such a scanner may be positioned so as to have a line-of-sight view of one or more sides, including the sidewalls and/or the top, of packages placed on shelf 202. Upon placement of package 108 onto shelf 202, the scanner may scan the graphical code affixed to package 108, and the package size information may be retrieved from the backend system.

In addition, or in the alternative, according to the second technique, the scanner may be affixed to robot 114. According to such embodiments, when robot 114 picks up the package for loading into a smart locker of smart locker system 102, or beforehand, robot 114 scans the graphical code using a scanner implementation of its sensor 212. As described above, the system may then retrieve the associated package size information from the backend system.

According to a third package size determination technique, the size of the package may be determined according to a bin, such as bin 206, in which an agent places the package. Smart staging area 200 may have bins of a variety of sizes available for such usage. When an agent places a package on a shelf 202, 204 in smart staging area 200, they may visually select a bin sized to accommodate the package. Each bin may have an associated code that indicates its size, and by association, the size of the package therein. Such a code may be implemented by way of a graphical code, such as a barcode or QR code, affixed to the bin in a place that can be scanned by a scanner implementation of sensor 212 on robot 114 and/or a scanner implementation of sensor 210 affixed to smart staging area 210. Alternately, or in addition, such a code may be implemented by way of an RFID, affixed to the bin, and sensed by an RFID sensor implementation of sensor 210 and/or an RFID sensor implementation of sensor 212.

According to embodiments that utilize the third package size determination technique, instead of picking up the packages directly, robot 114 picks up bin 206, and loads it into the appropriate locker of smart locker system 102. Thus, bin 206 may include robot pickup points 208 that allow robot 114 to easily locate, pick up, remove, and handle bin 206.

Further according to embodiments that utilize the third package size determination technique, bin 206 may lack one or more sides, so that a customer may retrieve the package from within a locker of smart storage locker 102 whilst the bin remains in the locker. As shown in FIG. 2, bin 206 lacks a left side and a side facing away from robot 114; however, any side or sides may be omitted according to various embodiments. Further, according to various embodiments, when inserted into a smart locker of smart locker system 102, a back wall (from the customer's perspective) of bin 206 may act as a seal to prevent customer access to the secure area. According to some embodiments, there may be a small lip on the sides of bin 206 to prevent sliding out and partial insertions of packages. The smart lockers of smart locker system 102 may remain locked unless bin 206 is fully in place and the interior of the smart locker is encapsulated by the rear wall of bin 206. Further, bin 206 may be configured with a large robot-facing side that is too big to fit entirely though a smart locker of smart locker system 102, so that bin 206 cannot be removed, or even partially removed, from the customer side of the smart locker by a customer. Alternative designs for bin 106 include a floor-only design, e.g., where robot 114 lifts the package from underneath, and a configuration where the package is dropped in from the side or top.

Designs of bin 206 that lack one or more walls are particularly advantageous because, when present on a shelf 202, 204 in smart staging area 200, the side of bin 206 facing an agent is open so that the agent can quickly and easily load packages onto bin 206. Advantages of the third technique in general include that it makes the packages effectively regular-sized from the perspective of robot 114, with specific and registerable pick-up points 208 for the robot to home in on and grab or otherwise physically interface with. Further, usage of bin 206 prevents loading packages that are too big for the smart lockers. Yet further, the usage of bin 206 allows for loading multiple packages per smart locker.

According to a fourth package size determination technique, the size of the package may be determined using a size sensor implementation of sensor 210 of fixtures of smart staging area 200 and/or a size sensor implementation of sensor 212 present on robot 214. Such sensor implementations may be of any suitable sensor for determining size information, including, by way of non-limiting example, acoustic sensors, infrared sensors, optical robotic vision sensors, and other sensor types. According to such embodiments, when a package is placed on a shelf 202, 204 of smart staging area 200, the sensor or sensors determine the size and convey the information to the backend computer system.

After the size of the package is determined, robot 114 determines whether an appropriately sized customer accessible repository, such as a locker in a smart locker system, e.g., smart locker system 102, is available to accept loading of the package. For example, a backend computer system may store an electronic record of smart lockers that are occupied, in association with package identification information for the packages located therein, as well as smart lockers that are unoccupied. The backend system may update the record each time a package is loaded into a smart locker or removed from a smart locker. According to some embodiments, each smart locker includes a sensor, such as an optical sensor, an acoustic sensor, an infrared sensor, or a weight sensor, that is used to determine whether the smart locker is occupied. Such sensors may be used instead of, or in addition to, the loading and removal record updating.

If a smart locker that is large enough to accept the package is unoccupied, robot 114 may proceed to load the package therein. Otherwise, robot 114 may wait until an appropriately sized locker becomes available for loading.

Figure 3:
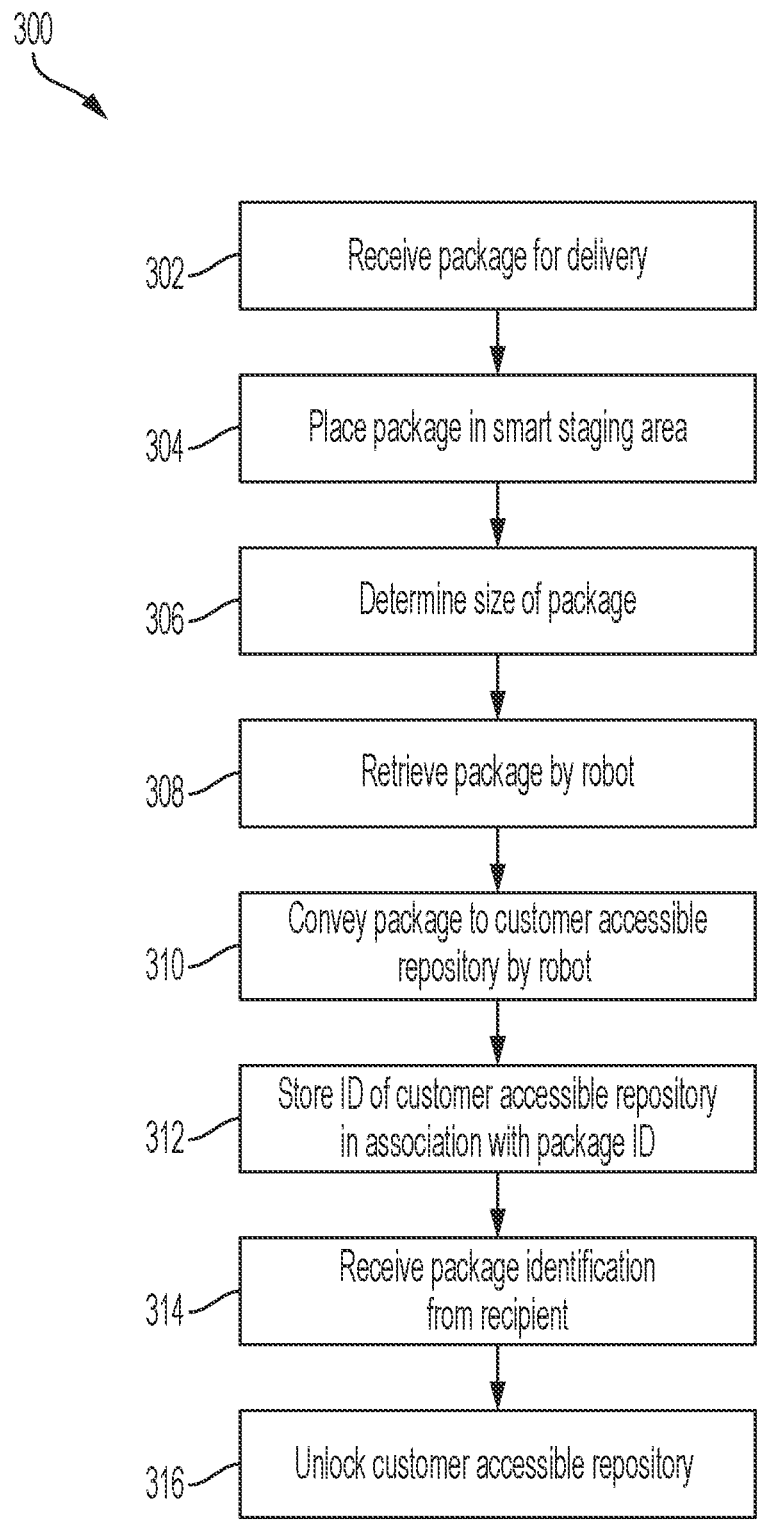
FIG. 3 is a flow diagram of a method for loading a smart locker to provide a package for retrieval by a recipient according to various embodiments.

FIG. 3 is a flow diagram of a method 300 for loading a customer accessible repository, such as a smart locker, to provide a package for retrieval by a recipient according to various embodiments. Method 300 may be implemented using robotic smart locker load system 100 of FIG. 1, with smart staging area 110, or with smart staging area 200 of FIG. 2.

At 302, a package is received for delivery to a recipient. The package may be received at a post office or other package delivery distribution center, for example. The package may have been sent through the mail and received at a location for "last mile" delivery. Delivery of the package to the recipient may have previously been attempted, without success. Alternately, the package may have been intended for delivery to the recipient directly through a smart locker.

At 304, an agent or other person places the package in a smart staging area, such as smart staging area 110 as shown and described herein in reference to FIG. 1, or smart staging area 200 as shown and described herein in reference to FIG. 2. The placement may be inside of a pigeonhole, on a shelf, or at, on, or in a different configuration of a smart staging area.

At 306, the size of the package is determined using a sensor. The size of the package may be determined according to the first package size determination technique as disclosed herein, the second package size determination technique as disclosed herein, the third package size determination technique as disclosed herein, the fourth package size determination technique as disclosed herein, or a different package size determination technique.

At 308, the package is retrieved from the smart staging area by a robot, such as, by way of non-limiting example, robot 114 as shown and described herein. The robot may retrieve the package by directly handling the package, e.g., with pincers or a different gripping, scooping, or lifting mechanism, or may be retrieved by the robot by being present in a bin, e.g., bin 206 as shown and described herein, which is lifted or otherwise conveyed by the robot.

At 310, the robot conveys the package to a customer accessible repository selected according to the size of the package as determined at 306. The customer accessible repository may be a smart locker of a smart locker system, such as smart locker system 102 as shown and described herein. The robot may convey the package through a first, customer inaccessible, side of the customer accessible repository, where the package is retrievable by the customer through a second, customer inaccessible, side of the customer accessible repository.

At 312, the system performing method 300 electronically stores an identification of the customer accessible repository in association with package identification information. Such information may be stored in a database of a backend system, e.g., as described herein in reference to FIG. 1.

At 314, the system performing method 300 receives package identification for the package, e.g., at a terminal in a customer accessible location proximate to the customer accessible repository. For example, according to some embodiments, the package identification information is received at a terminal, such as terminal 104 as shown and described herein in reference to FIG. 1. The package identification may be conveyed in the form of a code, such as a graphical code (e.g., a barcode or QR code) or character code (e.g., a numeric or alphanumeric code).

At 316, the customer accessible repository is unlocked in response to receiving the package identification at 312. For example, according to some embodiments, the system may unlock a smart locker that contains the package identified by the package identification. Once unlocked, the recipient may retrieve their package through the second side of the customer accessible repository.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of providing a package for retrieval, the method comprising:
receiving, at a package delivery distribution facility, a package for retrieval by a recipient;
placing, by a person, the package in a customer inaccessible smart staging area, wherein the placing the package in the smart staging area comprises placing the package in a bin at the smart staging area;
determining, using a sensor, a size of the package, wherein the determining the size of the package is based on the bin;
retrieving, by a robot, the package from the smart staging area;
selecting a customer accessible repository according to the size of the package;
conveying, by the robot and in response to the selecting, the package to the customer accessible repository selected according to the size of the package, wherein the conveying comprises conveying the package through a first side of the customer accessible repository, and wherein the package is retrievable by a customer through a second side of the customer accessible repository different from the first side of the customer accessible repository, wherein the conveying comprises inserting the bin, containing the package, into the customer accessible repository, wherein the bin lacks a wall corresponding to the second side of the customer accessible repository;
electronically storing an identification of the customer accessible repository in association with package identification information;
receiving, at an electronic customer interface located at the package delivery distribution facility, and from the recipient, the package identification information; and
unlocking, by a backend computer system that electronically stores an identification of the customer accessible repository in association with the package identification information, the second side of the customer accessible repository in response to receiving the package identification information, wherein the package is retrievable from the second side of the customer accessible repository by the recipient.

2. The method of claim 1, wherein the smart staging area comprises a plurality of locations for a plurality of package sizes, and wherein the determining the size of the package is based on a location of the package in the smart staging area.

3. The method of claim 1, wherein the sensor comprises a scanner, and wherein the determining the size of the package comprises scanning a code affixed to the package and retrieving package size information from a backend system based on the scanning.

4. The method of claim 3, wherein the scanner is attached to the robot and the scanning is performed by the robot.

5. The method of claim 3, wherein the scanner is attached to a fixture of the smart staging area.

6. The method of claim 1, wherein the sensor comprises a scanner, and wherein the determining the size of the package is based on scanning, by the scanner attached to at least one of the robot or a fixture in the smart staging area, a code affixed to the bin.

7. The method of claim 1, wherein the determining the size of the package is based on an output from the sensor, wherein the sensor is attached to at least one of the smart staging area or the robot.

8. The method of claim 1, wherein the customer accessible repository is one of a plurality of customer accessible repositories of a plurality of sizes, the method further comprising, prior to the conveying, determining that the customer accessible repository is unoccupied.

9. A system for providing a package for retrieval, the system comprising:
a smart staging area located at a package delivery distribution facility that receives a package from a person for retrieval by a recipient, the smart staging area comprising a sensor, wherein the system determines a size of the package based on an output from the sensor;
a bin configured to accept the package in the smart staging area, wherein the system determines the size of the package based on the bin;

a robot disposed to retrieve the package from the smart staging area and convey the package to a customer accessible repository, selected according to the size of the package, through a first side of the customer accessible repository, wherein the package is retrievable by a customer through a second side of the customer accessible repository different from the first side of the customer accessible repository, wherein the bin lacks a wall corresponding to the second side of the customer accessible repository, and wherein the bin containing the package is insertable into the customer accessible repository;

a backend computer system that electronically stores an identification of the customer accessible repository in association with package identification information; and an electronic customer interface located at the package delivery distribution facility, wherein the electronic customer interface is communicatively coupled to the backend computer system, wherein the backend computer system unlocks the second side of the customer accessible repository and the package is retrievable from the second side of the customer accessible repository by the recipient in response to the electronic customer interface receiving the package identification information from the recipient.

10. The system of claim 9, wherein the smart staging area comprises a plurality of locations for a plurality of package sizes, and wherein the system determines the size of the package based on a location of the package in the smart staging area as detected by the sensor.

11. The system of claim 9, wherein the sensor comprises a scanner, and wherein the system determines the size of the package based on the sensor scanning a code affixed to the package and retrieving package size information from the backend computer system.

12. The system of claim 11, wherein the scanner is attached to the robot and the scanning is performed by the robot.

13. The system of claim 11, wherein the scanner is attached to a fixture of the smart staging area.

14. The system of claim 9, wherein the sensor comprises a scanner, and wherein the system determines the size of the package based on scanning, by the scanner attached to at least one of the robot or a fixture in the smart staging area, a code affixed to the bin.

15. The system of claim 9, wherein the sensor is attached to at least one of the smart staging area or the robot.

16. The system of claim 9, wherein the customer accessible repository is one of a plurality of customer accessible repositories of a plurality of sizes, wherein the backend computer system determines that the customer accessible repository is unoccupied.

\* \* \* \* \*